United States Patent Office 3,470,842
Patented Oct. 7, 1969

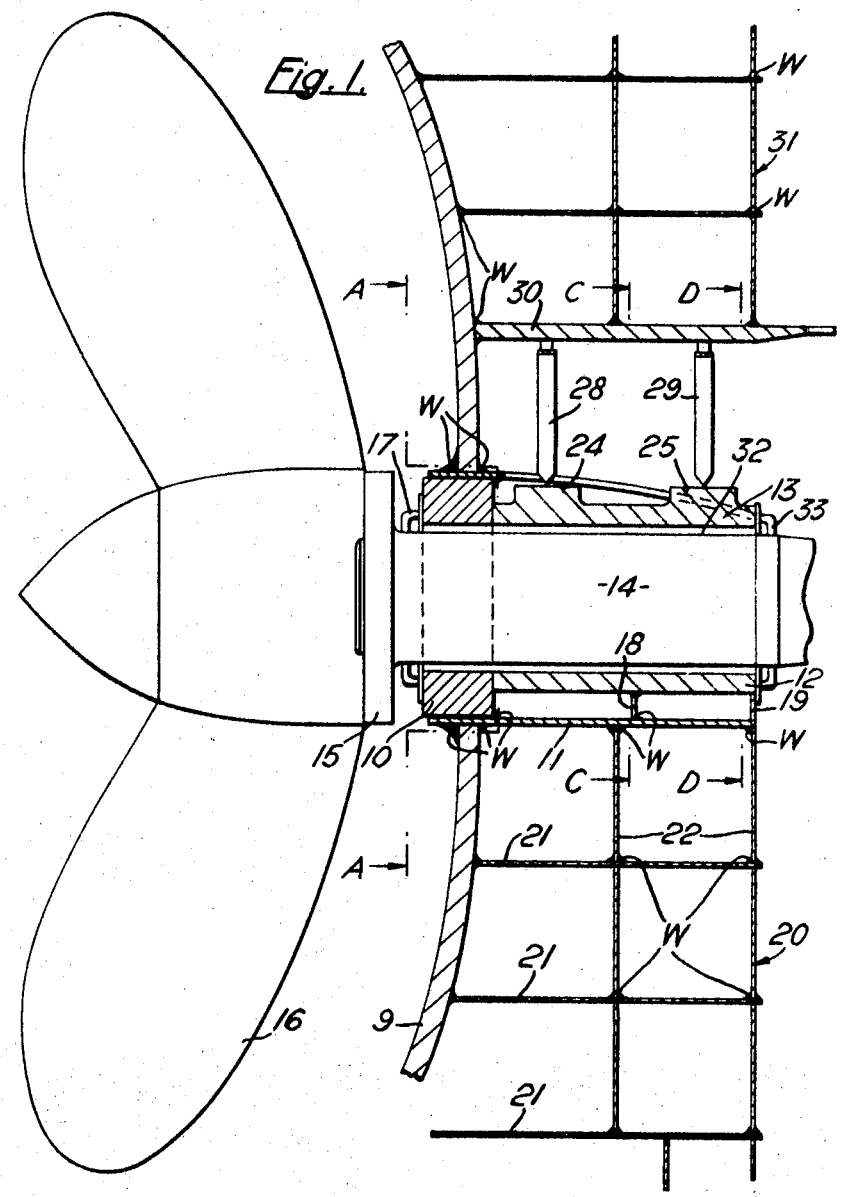

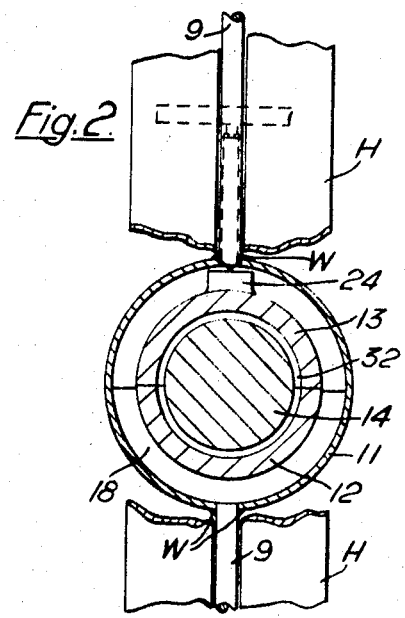
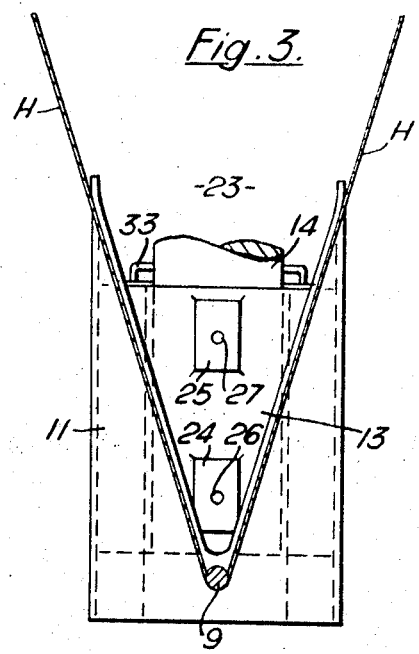

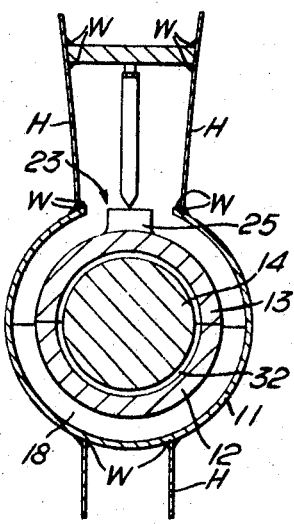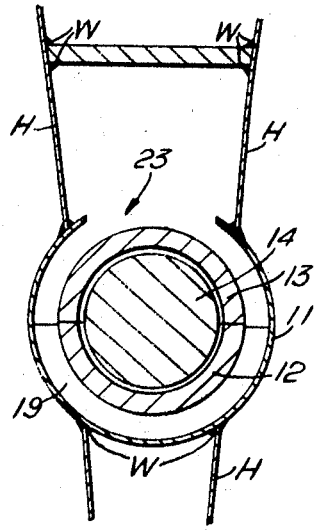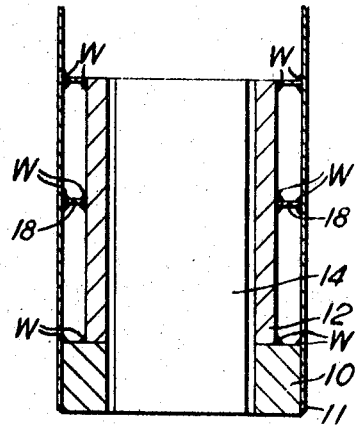

3,470,842
SHIP HAVING SPLIT STERN BEARING
John A. Clay, Bowdon, England, assignor to Turnbull Marine Design Co. Limited, Old Trafford, Manchester, England, a British company
Filed Mar. 11, 1966, Ser. No. 533,617
Claims priority, application Great Britain, Apr. 20, 1965, 16,439/65
Int. Cl. B63h 5/06, 23/32
U.S. Cl. 115—34      2 Claims

ABSTRACT OF THE DISCLOSURE

A propeller shaft stern bearing arrangement having a split bearing comprising a lower part extending forwardly from an opening in the stern frame of a ship and rigid therewith, an upper bearing part axially abutting means defining the opening, the upper bearing part being urged into a shaft encasement position by hydraulic means acting between the upper bearing part and a countersupport extending forwardly from the stern frame, the upper bearing part being removable to allow inspection of the shaft from within the hull while the ship is afloat and while the shaft is supported in the lower bearing part, and an outboard mechanical seal extending around the shaft and sealing the shaft to the opening defining means.

---

This invention relates to ships and other mechanically-propelled water-borne craft in particular to sea-going vessels, (hereinafter and in the claims referred to simply as "ships").

As is known, it is a requirement that ocean-going and sea-going ships are inspected periodically to ensure that they are seaworthy and one of the tasks during such an inspection is examination of the or each propeller and propeller shaft.

It has hitherto been customary to encase the or each propeller tail-shaft in a stern tube extending from the after-peak bulkhead to the stern of the vessel, said tube containing an annular bearing through which the shaft extends and which is made of white metal, or of a hard fibrous material known by the name "Tufnell," or of lignum vitae.

To inspect the or each tail-shaft so encased, it has, with a fixed pitch propeller, been necessary to remove the propeller, disconnect the tail-shaft from the remainder of the shaft, and draw the tail-shaft forwardly from the stern tube. In the case of a controllable-pitch propeller it has been necessary, in a single screw vessel, to remove the propeller and sometimes the rudder, and to draw the tail-shaft rearwardly from the stern tube.

In both cases the work is expensive and occupies much time.

It is an object of the present invention to provide a method of encasing propeller tail-shafts which enables in situ inspection of the tail-shafts.

The present invention is a method of encasing a propeller tail shaft in a ship, comprising so fitting a split bearing about the tail-shaft inboard of the hull that the tail-shaft is adequately supported and part of the bearing is removable without vitiating the support, whereby the tail-shaft can be inspected without disturbance of any operative part and while the ship is afloat.

The present invention is a method of encasing a propeller tail-shaft in a ship, comprising supporting the tail-shaft from below in part of a split bearing stationarily located relative to the ship's hull, and pressing the other part of the bearing into position from above thus to encase the tail-shaft, whereby said other part can be removed to enable inspection of the tail-shaft without disturbance of the first-named part and while the ship is afloat.

The present invention is a ship whose propeller tail-shaft is so encased in and supported by a split bearing that part of the bearing is removable to enable inspection of the tail-shaft without disturbance of any operative part and while the ship is still afloat.

The present invention is a ship whose propeller tail-shaft is supported from below in part of a split bearing fixedly located relative to the ship's hull and wherein completion of encasement of the tail-shaft is effected by the other part of the bearing pressed into position from above in a manner enabling removal of said other part to expose the tail-shaft for inspection without disturbance of any part operative to propel the ship and while the ship is afloat.

An embodiment of the invention will now be described, by way of example, with reference to the accompanying drawing, wherein:

FIG. 1 is a longitudinal sectional elevation at the stern of a ship according to the invention, showing the mounting of a tail-shaft supporting bearing;

FIG. 2 is a section on the line A—A of FIG. 1;

FIG. 3 is a view in the direction of arrow B of FIG. 1;

FIG. 4 is a section on the line C—C of FIG. 1;

FIG. 5 is a section on the line D—D of FIG. 1; and

FIG. 6 is a longitudinal axial section through the tail-shaft and bearing.

Referring now to the drawing, the stern frame 9 of the ship mounts a neck ring 10 plugging the peripherally-complete after-end of a tube 11 within which is mounted a split bearing 12, 13 through which extends the tail-shaft 14.

The tail-shaft 14 extends through the neck ring 10 to the exterior of the hull and there ends in a flange 15 on which the propeller 16 is mounted. An external gland 17 is provided about the tail-shaft where it emerges from the hull to prevent entry of water into the split bearings 12, 13.

The reference W indicates welding zones, and it will be noted that the neck ring 10 and tube 11 are welded to the stern frame 9 as is also the lower half shell 12 of the split bearing. The half shell 12 is supported in spaced and axially parallel relationship from the tube 11 by semi-annular spacers 18 and 19 welded to both members. The tube 11 in turn is mounted on and welded to a fabricated framework 20 comprising transversely-extending plates 21 and 22 respectively, which are respectively horizontal and vertical when the ship is on an even keel and which are shaped to conform to the hull contour at the stern of the ship. The plates 21 and 22 are welded to one another and to the hull H, the horizontal plates 21 being welded also to the stern frame 9.

It will be manifest from the foregoing that the lower half shell 12 of the split bearing is rigid with the ship's structure.

The tube 11 considered in plan has a symmetrical V-shaped cut-out 23 whose apex is centered on the stern frame 9 and which follows the contour of the hull H as best seen in FIG. 3. The upper half shell 13 of the split bearing has centrally-disposed boxes 24 and 25 in the centres of which are seatings 26 and 27 for the pointed lower ends of hydraulically-operated screw-jacks 28 and 29 disposed normal to the bearing and whose upper ends find support against a base plate 30 of relatively heavy gauge which is the lower member of a fabricated framework 31 similar to the framework 20.

Pressure applied through the jacks 28 and 29 holds the upper half shell 13 firmly in place. However, when inspection of the tail-shaft 14 is to be made, the jacks are retracted and the upper half shell 13 of the split bearing is removed. This operation can readily be effected while the ship is afloat, and there is no disturbance of operative parts.

The bearing has a white metal liner and is filled with oil at 32, a gland 33 at the inboard end of the bearing preventing inboard leakage of oil from the bearing.

The length of the split bearing need only be from two and one half to three and one half times the diameter of the propeller shaft, whereas the bearing has hitherto usually been four times the shaft diameter and has consequently been more susceptible to troubles arising from shaft deflection in service.

A primary advantage of the invention of course, is that the tail-shaft can be inspected while the ship remains afloat this being especially advantageous with large vessel, for example large tankers, which may have to travel far for suitable dry-docking facilities. The case in which tail-shaft inspection can be made affords the possibility of regular short-term inspections.

Adjustments to the bearing, such as the provision of a new liner, can also readily be made.

I claim:

1. In a ship, a propeller shaft stern bearing arrangement comprising means defining an opening in the stern frame of the hull of said ship, a propeller shaft extending through said opening, a split bearing around said shaft, said split bearing comprising a lower bearing part supporting said propeller shaft, said lower bearing part extending forwardly from said opening and being rigid with said stern frame, and an upper bearing part abutting said opening defining means and co-operating with said lower bearing part to encase said shaft, said upper bearing part being removable from said propeller shaft to allow inspection of said bearing shaft from within said hull while said ship is afloat, counter support means projecting forwardly from said stern frame and rigid therewith, hydraulically expansible means acting against said countersupport means and said upper bearing part for urging said upper bearing part downwardly into its shaft encasement position, and mechanical sealing means on the outboard side of said opening defining means and sealing said propeller shaft to said opening defining means.

2. The propeller shaft stern bearing arrangements of claim 1 further comprising further mechanical sealing means disposed inboard of said ship at the forward end of said split bearing for sealing said split bearing to said propeller shaft.

References Cited

UNITED STATES PATENTS

| | | | |
|---|---|---|---|
| 2,283,291 | 5/1942 | Selden | 114—57 |
| 3,209,720 | 10/1965 | Campbell et al. | 115—0.5 |
| 2,636,790 | 4/1953 | McNally | 115—34 X |
| 3,236,570 | 2/1966 | Satterthwaite | 308—238 X |

TRYGVE M. BLIX, Primary Examiner